United States Patent [19]

Aronne

[11] Patent Number: 5,525,847
[45] Date of Patent: Jun. 11, 1996

[54] POWER SOURCE FOR AN ELECTROBALLISTIC SEQUENCING SYSTEM

[75] Inventor: Armand J. Aronne, South Massapequa, N.Y.

[73] Assignee: Northrop Grumman Corporation, Los Angeles, Calif.

[21] Appl. No.: 396,360

[22] Filed: Feb. 28, 1995

Related U.S. Application Data

[63] Continuation of Ser. No. 955,406, Oct. 2, 1992, abandoned.

[51] Int. Cl.⁶ .................................................. B64D 25/08
[52] U.S. Cl. ............................... 307/125; 244/122 AE; 307/43
[58] Field of Search .................................. 307/48, 64–66, 307/9.1, 10.1, 125, 46, 72, 76, 82, 43, 139, 112, 113, 119, 154; 244/122 AE, 122 R, 121, 122 AF; 102/206, 217; 200/519, 538–546; 361/250, 248; 340/438, 440, 669

[56] References Cited

U.S. PATENT DOCUMENTS

| | | | |
|---|---|---|---|
| 3,556,442 | 1/1971 | Arnekull | 244/122 R |
| 3,570,404 | 3/1971 | Pope | 102/207 |
| 3,630,472 | 12/1971 | Axenborg | 244/121 |
| 3,669,388 | 6/1972 | Van Kreuningen | 244/122 AE |
| 4,275,858 | 6/1981 | Bolton et al. | 244/122 AF |
| 4,395,001 | 7/1983 | Stone et al. | 244/122 AE |
| 4,448,374 | 5/1984 | Duncan | 244/122 AE |
| 4,505,444 | 3/1985 | Martin | 244/122 AE |
| 4,689,834 | 9/1987 | McCarthy et al. | 2/422 |
| 4,706,909 | 11/1987 | Cuevas et al. | 244/122 AE |
| 4,792,903 | 12/1988 | Peck et al. | 244/122 AE |
| 4,851,756 | 7/1989 | Schaller et al. | 307/66 |
| 4,911,382 | 3/1990 | Aronne | 244/122 AE |

Primary Examiner—William M. Shoop, Jr.
Assistant Examiner—Richard T. Elms
Attorney, Agent, or Firm—Terry J. Anderson; Karl J. Hoch, Jr.

[57] ABSTRACT

Start-up electrical power modules are utilized in electroballistic sequencing systems for initiating the ballistic sequence necessary for seat and canopy ejection in military aircraft. The power modules utilize aircraft power to initiate the ballistic sequence necessary for ejection of the pilot or pilots. The power module also comprises two independent internal power supplies as back-up power sources in the event of total aircraft power failure. The power modules are activated by the manual pulling action of an actuation shaft by the pilot or by the automatic pushing action of the actuation shaft by a piston once the pilot initiates the ejection sequence. Once the actuation shaft is pulled into an armed position, dual switches are activated thereby supplying electrical power from the aircraft or from the back-up power sources to a signal conditioner and controller. The signal conditioner and controller processes the signals and outputs a single direct current signal to a ballistic sequencer.

25 Claims, 2 Drawing Sheets

POWER SOURCE FOR AN ELECTROBALLISTIC SEQUENCING SYSTEM

This is a continuation of application Ser. No. 07/955,406 filed on Oct. 2, 1992 now abandoned.

BACKGROUND OF THE INVENTION

1. Field of the Invention

The present invention relates to a power source having two independent internal power supplies as back-up power sources, and more particularly, to a power module having multiple levels of redundancy for an electroballistic sequencing system utilized in ejection seat systems of military aircraft.

2. Discussion of the Prior Art

The majority of state of the art ejection seat/canopy sequencing systems utilized in military aircraft are pyrotechnic or ballistic type systems such as hot gas, shielded mild detonated cord and TLX. These ballistic systems are started or activated by the mechanical actuation of a ballistic initiator which creates a super fast ballistic shock wave or signal that travels through a ballistic conduit in a manner analogous to that of an electrical signal through a wire. Although effective, there are a number of disadvantages associated with these types of systems. The two most prominent disadvantages of ballistic systems are system operational lifetime, and ejection sequence timing accuracy, both of which are caused by the inherent characteristics of the system components. Firstly, the chemical constituents utilized in a ballistic device have a fixed lifetime of usefulness, typically 5 to 8 years, and thereafter must be replaced. Accordingly, the system components must be replaced at regular maintenance intervals which is costly in terms of time and money as well as aircraft unavailability. Secondly, ejection sequence timing requires fixed delays; therefore, the ballistic sequence is timed to generate these delays. However, the ballistic initiation is generally based upon some type of chemical reaction and therefore is inherently less accurate than an electrically created time delay.

Recently, ejection seat/canopy sequencing systems are utilizing electroballistic sequencing. These electroballistic systems are started or initiated by turning on an electrical power source. Whereas in a purely ballistic system the chemical constituents must be replaced at regular internals, the components in the electroballistic system, such as cables, plugs, dividers, and resistors, are good for the life of the aircraft, and only a small and accessible portion of the system has to be periodically changed. In addition, as stated above, electrical systems are more accurate in terms of timing as their ballistic counterparts.

SUMMARY OF THE INVENTION

The present invention is directed to a power module for an electroballistic sequencing system. The power module comprises an actuation means for initiating the electroballistic sequence, at least one internal power source for supplying a first internal electrical signal to initate a ballistic signal, signal conditioning and controlling means for routing either the first internal electrical signal or at least one external electrical signal supplied by an external power source to an ejection sequencer, and switching means for supplying either the first internal electrical signal or the external electrical signal to the signal conditioning and controlling means.

The power module of the present invention provides an accurate and reliable power source for seat and canopy ejection systems utilized in military aircraft. To provide fail safe operation of the seat and canopy ejection systems, the power module incorporates multiple levels of redundancy. Specifically, the power module comprises two internal batteries each capable of supplying an electrical signal for initiating the ballistic sequence. In addition, the power module also receives and processes three external signals from aircraft sources, which can also be utilized for initiating the ballistic sequence. Therefore, the power module incorporates five levels of redundancy to ensure fail safe operation of the seat and canopy ejection system.

The power module of the present invention is a relatively simplistic system which is easy to manufacture and maintain. The internal components of the power module are designed to last the lifetime of the aircraft. In addition, the power module can easily be retrofit into any number of existing aircraft. Accordingly, the power module is a highly efficient and low cost device which provides for fail safe operation of seat and canopy ejection systems.

DETAILED DESCRIPTION OF THE PREFERRED EMBODIMENTS

The present invention is directed to a power module for an electroballistic sequencing system utilized in the ejection seats of military aircraft. The power module provides for multiple levels of redundancy to ensure fail safe operation of the seat and canopy ejection sequencing system. In addition, the power module is capable of initiating an aircraft's seat and canopy ejection sequencing system in the event of a total power loss in the aircraft.

The power module can also be utilized in other electrical systems which require independent, stand alone electrical power sources. Basically, the power module can be utilized as the start up electrical power source for a mulitple of aircraft systems or other similar systems where a highly reliable power source is required.

Figure 1:
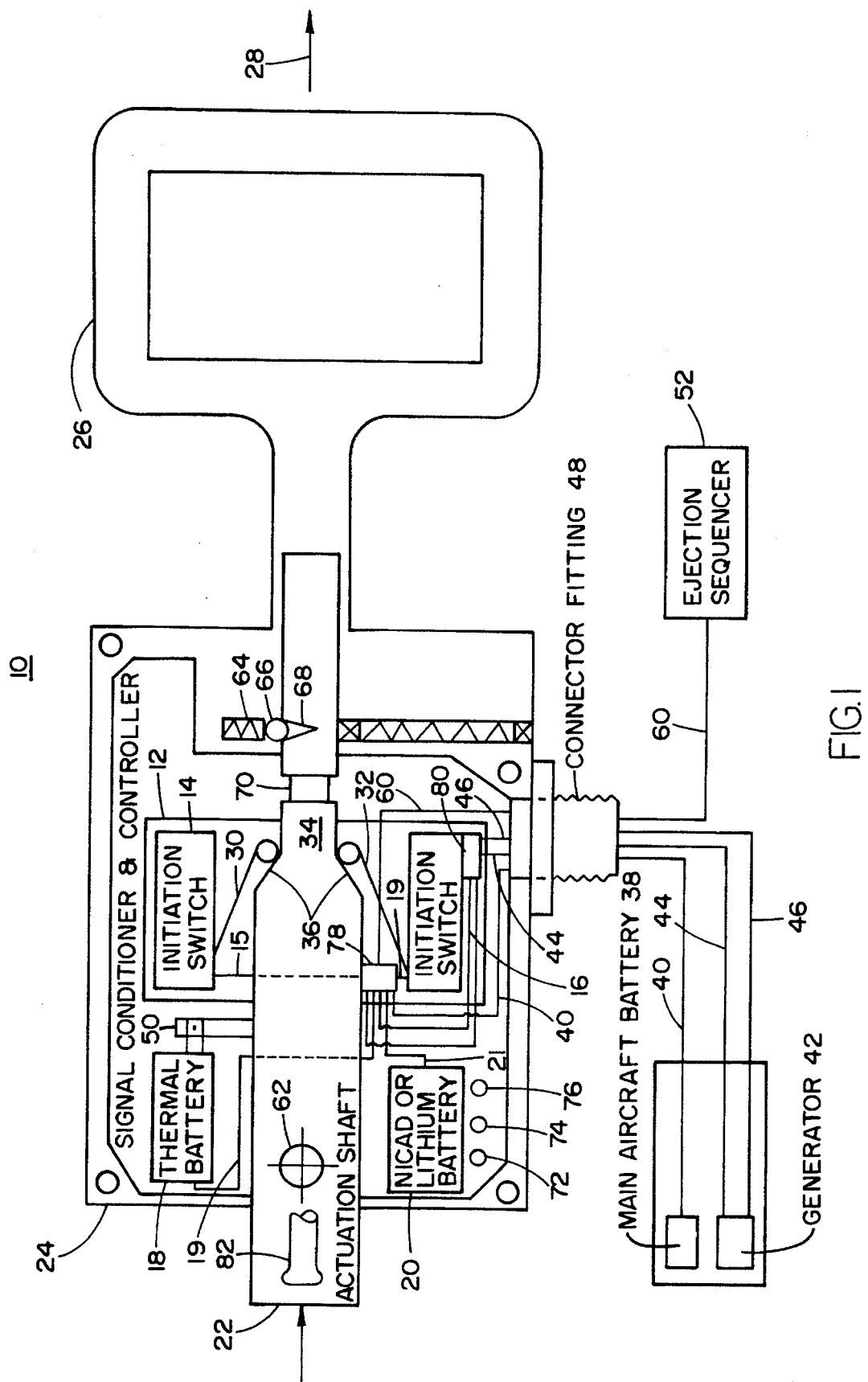
FIG. 1 is a diagrammatic representation of the start-up electrical power module of the present invention.

Referring to FIG. 1, there is shown a diagrammatic representation of the start-up electrical power module 10. The power module 10 comprises a signal conditioner and controller 12, dual initiation switches 14 and 16, a thermal battery 18, a standard chemical battery such as a Nickel Cadmium battery 20 or a new technology chemical battery such as a Lithium battery 20, and an actuation shaft 22, all housed within a sealed unit 24. In aircraft having seat and canopy ejection systems which are initiated by a pulling type action, a handle 26 is connected to one end of the actuation shaft 22. In aircraft having seat and canopy ejection systems which utilize a pressure source initiation, a piston type device which is not shown in the figure, but which is familiar to those skilled in the art, is connected to the other end of the actuation shaft 22 and provides a pushing type action upon the actuation shaft 22.

The operation of the power module 10 is described with respect to a pulling action initiation via the handle 26, however, it should be understood by those skilled in the art that the power module 10 operates in the same manner regardless of the type of initiation action. To initiate the ejection sequence, the handle 26 is pulled in the direction of the arrow 28 thereby causing the actuation shaft 22 to move into the armed position. As the actuation shaft 22 moves into the armed position, the dual switches 14 and 16 are forced into the on position. The dual switches 14 and 16 comprise contact levers 30 and 32 respectively, which rest upon a smaller diameter section 34 of the actuation shaft 22 when the shaft 22 is in the unarmed position. As the actuation shaft 22 is moved into the armed position, the contact levers 30 and 32 are forced outward by a tappered section 36 of the actuation shaft 22, thereby forcing the dual switches 14 and 16 into the on state. Dual switches 14 and 16 are utilized to provide an additional level of redundancy in the power module 10. In the unlikely event that a switch fails, there is always a second switch available to ensure that the power module 10 operates without interruption.

The dual switches 14 and 16 are operable to supply at least one electrical signal from four possible power sources to the signal conditioner and controller 12. Two of the possible power sources are the thermal battery 18 and either the Lithium or Nickel Cadmium battery 20. The remaining two power sources are external to the power module 10. The two external sources, which include the main aircraft battery 38 which supplies a twenty-eight volt D.C. signal via line 40, and the aircraft generator 42 which supplies a first one hundred ten volt A.C. signal via line 44 and a second one hundred ten volt A.C. signal supplied via line 46, provide three possible electrical signals for operation of the power module 10. The two A.C. signals are supplied by the aircraft generator 42 to provide power for the directional movement of the seat. One signal is utilized to control the backward and forward motion of the seat and the other signal is utilized to control the up and down motion of the seat. Accordingly, since these two A.C. signals are already conveniently placed in the cockpit, the two A.C. signals are tapped via lines 44 and 46 for use by the power module 10. The three external electrical signal lines 40, 44 and 46 are brought into the power module 10 through a connector fitting 48 located on the underside of the housing 24. If the aircraft power supplies 38 and 42 are operational then all four possible power sources 18, 20, 38 and 42 would be supplying at least one electrical signal to the signal conditioner and controller 12 when the actuation shaft 22 is moved into the armed position. If however the aircraft power supplies 38 and 42 were not operational, then the two battery sources 18 and 20 would be the only sources supplying the electrical signal to the signal conditioner and controller 12.

The Lithium or Nickel Cadmium battery 20 is capable of supplying at a minimum, a one amp, one watt electrical signal to the signal conditional and controller 12 on demand. Typically, batteries of this type provide five amp signals for a short duration; however, all that is required to initiate the ballistic sequence is a one amp, one watt electrical signal for a short duration. Given that the entire ejection sequence is completed within five seconds, the electrical signal from the battery need last only a fraction of that time. The thermal battery 18 is a backup battery also capable of supplying at a minimum, a one amp, one watt electrical signal in the event that the Lithium or Nickel Cadmium battery 20 fails. The thermal battery 18 is mechanically actuated by a lever mechanism 50 connected to the actuation shaft 22. Accordingly, when the actuation shaft 22 is moved into the armed position, the thermal battery 18 is automatically activated by the movement of the lever mechanism 50 which causes an explosive mixture of two electrolytes within the thermal battery 18. The mixing of the two electrolytes causes a rapid build-up of current within approximately a tenth of a second. This electrical signal, which is also of short duration, is then supplied, via the dual switches 14 and 16 to the signal conditioner and controller 12.

Figure 2:
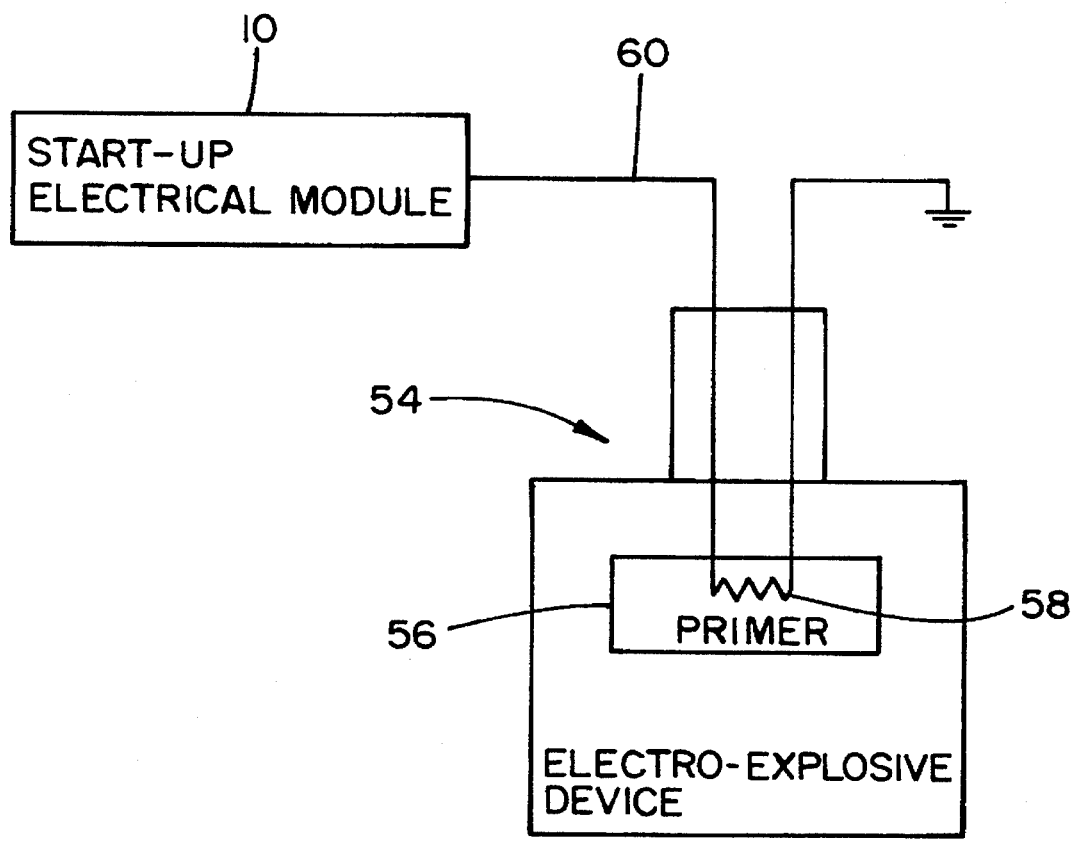
FIG. 2 is a diagrammatic representation of an electro-explosive device.

The signal conditioner and controller 12 comprises a simple switching or routing network 78 and a rectifer circuit 80. The routing network 78 is utilized to control which of the five possible electrical signals will be output to initiate the ejection sequence. The routing network 78 operates on a heirarchal basis which is preprogrammed or preset into the device. The ejection sequencer 52 requires at a minimum a one amp, one watt D.C. signal to initiate the ballistic sequence. Referring to FIG. 2, there is shown an electro-explosive device 54, EED, having an explosive charge which initiates the ballistic signal and a primer 56. The primer 56 comprises a bridge wire 58 which heats up when the signal from the power module 10 passes therethrough. The primer 56 is ignited by the heat energy output from the bridge wire 58 which causes the explosive charge to detonate. Since a D.C. signal is required, the reticfier circuit 80 of the signal conditioner and controller 12 is necessary if either of the two A.C. signals from the aircraft generator 42 are utilized. The rectifier circuit 80 is a simple diode arrangement which acts as a half-wave rectifier. A full-wave rectifier circuit is not necessary because the D.C. signal required by the EED 54 need not be a "clean" signal. The thermal battery 18 is connected to the routing network 78 via line 19, the chemical battery 20 is connected to the routing network 78 via line 21, and the main aircraft battery 38 is connected to the routing network 78 via line 40. The two signals from the generator 42 are directed through the rectifier circuit 80 via lines 44 and 46 and then directly output to the routing network 78. The dual switches 14 and 18 provide control signals to the routing network 78 via lines 15 and 17 respectfully, wherein the routing network 78 outputs the D.C. signal. The D.C. signal from the signal conditioner and controller 12, or more specifically the routing network 78, is output from the power module 10 via line 60 which exits through the connector fitting 48.

The power module 10 comprises a number of safety devices. Referring back to FIG. 1, a safety pin 82 is placed within a safety pin hole 62 in the actuation shaft 22 to prevent accidental or inadvertent movement of the actuation shaft 22 into the armed position. The safety pin is connected to a safety flag which is located within the cockpit area. In order to initiate the ejection sequence, the safety flag must be pulled thereby removing the safety pin from the actuation shaft 22. A detent locking device 64 prevents the actuation shaft 22 from moving out of the armed position once set there. The detent locking device 64 comprises a spring loaded ball 66 which fits into a detent groove 68 when the actuation shaft 22 is in the unarmed position, and into a notch 70 of the actuation shaft 22 when the actuation shaft 22 is in the armed position. The power module 10 is also designed to work in conjunction with a handle lock which is typically located on the ride of the seat. In order to pull the handle on the power module 10, the handle lock must be rotated to an unlocked position.

The power module 10 also comprises device checking means. A battery power check device 72 is located on the housing 24 of the power module 10 and indicates if the Lithium or Nickel Cadmium battery 20 is operational. Additionally, there is a built-in-test, BIT, check point 74 on the power module 10. The built-in-test for this system would be a continuity check. The text involves passing a small current throughout the system to determine if there is a complete circuit. Additionally, there is a ground point 76 on the power module 10 which also serves as an aircraft ground.

Although shown and described is what are believed to be the most practical and preferred embodiments, it is apparent that departures from specific methods and designs described and shown will suggest themselves to those skilled in the art and may be used without departing form the spirit and scope of the invention. The present invention is not restricted to the particular constructions described and illustrated, but should be constructed to cohere with all modifications that may fall within the scope of the appended claims.

What is claimed is:

1. A power module for an electroballistic sequencing system, said power module comprising:
   (a) a non-pyrotechnic actuation means for electrically initiating said electroballistic sequencing system;
   (b) first and second internal power sources for generating first and second internal electrical signals to initiate a ballistic signal;
   (c) signal conditioning and controlling means for routing either said first internal electrical signal, said second internal electrical signal, a first external electrical signal supplied by an external power source, a second external electrical signal supplied by said external power source, or a third external electrical signal supplied by said external power source to an ejection sequencer;
   (d) switching means for supplying either said first internal electrical signal, said second internal electrical signal, said first external electrical signal, said second external electrical signal, or said third external electrical signal to said signal conditioning and controlling means, said switching means being switched on by said actuation means; and
   (e) device checking means for providing an integrity check for said electroballistic sequencing system, said device checking means comprising a battery power check device for testing said first and second internal power sources, and a built-in-test contact for checking the continuity of said electroballistic sequencing system.

2. The power module according to claim 1, wherein said non-pyrotechnic actuation means comprises a shaft movable between an unarmed position and an armed position, said shaft having a handle attached thereto for moving said shaft from said unarmed position to said armed position.

3. The power module according to claim 2, wherein said first internal power source is a Nickel Cadmium battery being capable of generating and delivering an at least one amp, one watt direct current electrical signal for a short duration.

4. The power module according to claim 2, wherein said second internal power source is a Lithium battery being capable of generating and delivering an at least one amp, one watt direct current electrical signal for a short duration.

5. The power module according to claim 2, wherein said second internal power source is a thermal battery, said thermal battery being activated by the movement of said shaft from said unarmed position to said armed positioned to generate and deliver an at least one amp, one watt direct current electrical signal for a short duration.

6. The power module according to claim 3, wherein said signal conditioning and controlling means comprises a rectifier circuit for converting said two one hundred-ten volt alternating current electrical signals into two direct current signals.

7. The power module according to claim 6, wherein said switching means comprises dual switches which are actuated by the movement of said shaft from the unarmed to armed position, said dual switches being operable for suppling either said first or second internal electrical signals, or said first, second, or third external electrical signals to said signal conditioning and controlling means.

8. The power module according to claim 2, wherein said external power source comprises an aircraft battery and an aircraft generator, said aircraft battery being capable of generating and delivering an at least one amp, one watt direct current electrical signal as said first external electrical signal, and said aircraft generator being capable of generating and delivering two one hundred-ten volt alternating current electrical signals as said second and said third external electrical signals.

9. The power module according to claim 8, wherein said signal conditioning and controlling means further comprises a routing network for routing one of said first internal electrical signal, said second internal electrical signal, said first external electrical signal, said second external electrical signal, or said third external electrical signal to said ejection sequencer.

10. The power module according to claim 2, further comprising a safety device for preventing the accidental initiation of said electroballistic sequencing system.

11. The power module according to claim 10, wherein said safety device is a safety pin positioned within a safety pin hole of said shaft.

12. A power module for an electroballistic sequencing system utilized in a seat and canopy ejection system of a military aircraft, said power module comprising:
    (a) a non-pyrotechnic actuation means for electrically initiating said electroballistic sequencing system;
    (b) two internal power sources for generating first and second internal electrical signals to initiate a ballistic signal;
    (c) signal conditioning and controlling means for routing either said first or second internal electrical signals or first, second, or third external electrical signals supplied by an external power source to an ejection sequencer;
    (d) switching means for supplying either said first or second internal electrical signals or said first, second or third external electrical signals to said signal conditioning and controlling means, said switching means being switched on by said actuation means;
    (e) safety device means for preventing the accidental initiation of said electroballistic sequencing system; and
    (f) device checking means for providing an integrity check for said electroballistic sequencing system, said device checking means comprising a battery power check device for testing said internal power sources, and a built-in-test contact for checking the continuity of said electroballistic sequencing system.

13. The power module according to claim 12, wherein said non-pyrotechnic actuation means comprises a shaft movable between an unarmed position and an armed position, said shaft having a handle attached thereto for moving said shaft from said unarmed position to said armed position.

14. The power module according to claim 13, wherein one of said two internal power sources is a Nickel Cadmium battery and the other is a thermal battery, both being capable of generating and delivering at least one amp, one watt direct current electrical signals for a short duration, said thermal battery being activated by the movement of said shaft from said unarmed position to said armed position.

15. The power module according to claim 13, wherein one of said two internal power sources is a Lithium battery and the other is a thermal battery, both being capable of generating and delivering an at least one amp, one watt direct current electrical signals for a short duration, said thermal battery being activated by the movement of said shaft form said unarmed position to said armed position.

16. The power module according to claim 13, wherein said external power source comprises an aircraft battery and an aircraft generator, said aircraft battery being capable of generating and delivering an at least one amp, one watt direct current electrical signal as said first external electrical signal, and said aircraft generator being capable of generating and delivering two one hundred-ten volt alternating current electrical signals as said second and third external electrical signals.

17. The power module according to claim 16, wherein said signal conditioning and controlling means comprises a rectifier circuit for converting said two one hundred-ten volt alternating current electrical signals into two direct current signals.

18. The power module according to claim 17, wherein said signal conditioning and controlling means further comprises a routing network for routing one of said first internal electrical signal, said second internal electrical signal, said first external electrical signal, said second external electrical signal, or said third external electrical signal to said ejection sequencer.

19. The power module according to claim 18, wherein said switching means comprises dual switches which are actuated by the movement of said shaft from the unarmed to armed position, said dual switches being operable for suppling either said first or second internal electrical signals, or said first, second, or third external electrical signals to said signal conditioning and controlling means.

20. The power module according to claim 12, wherein said safety device is a safety pin positioned within a safety pin hole of said actuation shaft.

21. A method for powering an electroballistic sequencing system, said method comprising the steps of:

(a) electrically initialing said electroballistic sequencing system without the use of pyrotechnics;

(b) generating first and second internal electrical signals to initiate a ballistic signal;

(c) routing either said first or second internal electrical signals, or first, second, or third external electrical signals supplied by an external power source to an ejection sequencer to initiate said ballistic signal;

(d) supplying either said first or second internal electrical signals, or said first, second, or third external electrical signals to a signal conditioning and controlling means for routing said internal and external electrical signals; and (e) verifying the integrity of said electroballistic sequencing system by performing a battery power check and a built-in-test of the continuity of said electroballistic sequencing system.

22. The method for powering an electroballistic sequencing system according to claim 21, wherein said initiating step comprises moving an actuation shaft from an unarmed position to an armed position.

23. The method for powering an electroballistic sequenting system according to claim 22, wherein said step of generating first and second internal electrical signals comprises generating and delivering at least one amp, one watt direct current electrical signals for a short duration.

24. The method for powering an electroballistic sequenting system according to claim 23, wherein said first, second and third external electrical signals are supplied from aircraft power sources.

25. The method for powering an electroballistic sequencing system according to claim 21, further comprising the step of preventing the accidental initiation of said electroballistic sequencing system.

\* \* \* \* \*